(12) United States Patent
Frey et al.

(10) Patent No.: US 8,649,145 B2
(45) Date of Patent: Feb. 11, 2014

(54) CIRCUIT ARRANGEMENT FOR LIMITING A VOLTAGE

(75) Inventors: Fritz Frey, Kunzelsau (DE); Manfred Kaiser, Kunzelsau (DE)

(73) Assignee: R. Stahl Schaltgerate GmbH, Waldenburg (DE)

( * ) Notice: Subject to any disclaimer, the term of this patent is extended or adjusted under 35 U.S.C. 154(b) by 929 days.

(21) Appl. No.: 12/594,537

(22) PCT Filed: Mar. 12, 2008

(86) PCT No.: PCT/EP2008/001946
§ 371 (c)(1),
(2), (4) Date: Nov. 19, 2009

(87) PCT Pub. No.: WO2008/122339
PCT Pub. Date: Oct. 16, 2008

(65) Prior Publication Data
US 2010/0116633 A1    May 13, 2010

(30) Foreign Application Priority Data
Apr. 4, 2007    (DE) .................. 10 2007 016 704

(51) Int. Cl.
*H02H 3/22* (2006.01)
(52) U.S. Cl.
USPC .......................................... 361/111

(58) Field of Classification Search
USPC .......................................................... 361/111
See application file for complete search history.

(56) References Cited

U.S. PATENT DOCUMENTS

| | | | |
|---|---|---|---|
| 3,539,865 A * | 11/1970 | Billings | 361/55 |
| 4,536,699 A * | 8/1985 | Baker | 323/276 |
| 5,559,660 A * | 9/1996 | Watson et al. | 361/58 |
| 6,541,947 B1 * | 4/2003 | Dittmer et al. | 323/284 |

FOREIGN PATENT DOCUMENTS

| | | | |
|---|---|---|---|
| DE | 110983 A * | 1/1975 | |
| DE | 110983 A1 | 1/1975 | |
| DE | 3322278 A1 | 12/1984 | |
| DE | 102006054354 A | 5/2008 | |
| GB | 1449607 A | 9/1976 | |

* cited by examiner

*Primary Examiner* — Jared Fureman
*Assistant Examiner* — Ann Hoang
(74) *Attorney, Agent, or Firm* — Leydig, Voit & Mayer, Ltd.

(57) ABSTRACT

A circuit arrangement for enforcing an intrinsically safe situation in a hazardous zone features a first switching device that lies in the series arm and a second switching device that lies in the shunt arm. If a fault occurs that would violate the conditions of intrinsic safety, the first switching device is initially blocked and the second switching device is switched through with a time delay such that the output terminals are mutually short-circuited. In addition, a monitoring device is provided for monitoring the load conditions at the switching device arranged in the series arm.

16 Claims, 3 Drawing Sheets

$S = f(\vartheta, U, P)$

CIRCUIT ARRANGEMENT FOR LIMITING A VOLTAGE

CROSS-REFERENCE TO RELATED APPLICATIONS

This patent application is the national phase of PCT/EP2008/001946, filed Mar. 12, 2008, which claims the benefit of German Patent Application No. 102007016704.2, filed Apr. 4, 2007, both of which are herein incorporated by reference in their entireties for all that they teach and disclose without exclusion of any part thereof.

FIELD OF THE INVENTION

The present invention relates generally to explosion prevention, and more particularly to a system and method for limiting voltage to explosion-proof at risk areas.

BACKGROUND OF THE INVENTION

A number of explosion-proofing protective measures are available for preventing unwanted and dangerous explosions of explosive gas mixtures in hazardous areas. These include an "intrinsic safety" protective measure. According to this protective provision, electric lines that lead into areas exposed to explosion hazards cannot create a spark whose energy is sufficient to ignite the gas mixture. Accordingly, it needs to be ensured that the voltage in the line and the maximum current being transmitted remain within permissible limits.

This can be enforced with so-called safety barriers. These safety barriers usually feature an ohmic resistor or transistors in the series arm. Due to their circuit design, however, they are usually not suitable for the power supply of modern bus systems.

Another disadvantage of these safety barriers is that they usually contain components that are irreparably destroyed when certain limit values are exceeded. Consequently, it is not only required to replace the device that has caused the damage, but also the safety barrier. This naturally results in a significant loss of time during the operation of the system protected by the safety barrier.

Another problem arises if semiconductors that today usually consist of normally off field-effect transistors are used in the series arm. In particular, under certain circumstances, a thermally overloaded semiconductor can no longer be properly switched off via its control input.

In other known applications, auxiliary voltages are generated from the supplied electrical energy by means of transformers in the hazardous zone. If such a transformer fails and delivers an excessive voltage, it is no longer possible to intervene with classic safety barriers—the excessive voltage occurs downstream of the safety barrier and not at its input.

In addition, known safety barriers interrupt the electrical connection between input and output, but are usually unable to short-circuit damaging voltages returning from the hazardous zone at the output.

Based on these circumstances, the invention aims to develop protective circuit arrangements that according to their design solve one or more of the aforementioned problems.

OBJECTS AND SUMMARY OF THE INVENTION

In order to attain this objective, it is an object of the protective circuit arrangement according to the invention to provide a two-pole energy input and a two-pole energy output, wherein a first controlled switching device lies between the first input terminal of the energy input and the first output terminal of the energy output, where this first switching device is designed for normally producing the electrical connection between the input and the output and for interrupting this electrical connection in case of a fault. Furthermore, a second controlled switching device is provided that makes it possible to bridge the two output terminals of the energy output. This reliably prevents undefined voltages that possibly exceed the permissible limit from appearing at the terminals that are no longer connected after the first switching device opens in case of a fault. Such situations can arise if energy storage devices are provided downstream of the circuit arrangement in connection with transformers, such that excessive voltages from such sources, or even excessive voltages as a result of electrostatic charges, can occur.

In order to prevent the first switching device from being electrically overloaded when the second switching device is activated, it is a further object of the invention to provide a time-delay circuit that only brings the second controlled switching device into the conductive state once the first switching device has interrupted the electrical connection to the input of the circuit arrangement.

It is another object of the invention to provide a protective circuit arrangement that once again features a two-pole energy input and a two-pole energy output. The second input is directly connected to the second output and a controlled switching device, usually a semiconductor switch, is arranged in the connecting line between the first input and the first output terminal. In order to prevent the semiconductor switch from reaching thermally hazardous operating ranges that could possibly prevent a proper shut-off, an additional power and/or current monitoring circuit is provided that monitors the current through and/or the power loss at the first switch gear. As soon as a limit value is exceeded, the power and/or current monitoring circuit ensures an interruption by means of the first switching device.

In each instance, the first switching device in the series arm can contain a field-effect transistor, preferably a normally off field-effect transistor.

In order to ensure a proper start of the protective circuit arrangement when a supply voltage is applied to the input of the protective circuit arrangement for the first time, it is an optional object of the invention to provide an ohmic resistor in the series arm that short-circuits the first switching device. This resistor has a resistance value such that an optionally provided second switching device can never be overloaded, or the safety criteria at the output of the circuit arrangement can never be exceeded.

According to one modification according to the second solution, a current and/or power loss monitoring circuit that monitors the corresponding parameters of the first switching device can also be provided in the first solution.

The power and/or current monitoring circuit can contain an amplifier, the control input of which is connected in parallel to the first switching device. An amplifier makes it possible to generate a control current that converts the first switching device into the blocking state and the second switching device into the conductive state. This amplifier can consist of an amplifier that simultaneously fulfills the function of the power and/or current monitoring circuit.

This input of the amplifier can be connected to an OR circuit, the inputs of which can simply be electrically decoupled from one another by sufficiently high resistances. The voltage drop at the first switching device and an additional signal that can be derived, for example, from the voltage of a downstream voltage transformer or from the protective circuit itself can be selectively supplied via these inputs.

The time-delay circuit associated with the second switching device can be implemented in the input thereof. The time-delay circuit can simply consist of an RC-element, where the control input of the second switching device lies parallel to the capacitor of this element.

The second switching device can consist of a normally off electronic component such as, for example, a thyristor or triac. These components provide the advantage of realizing a very simple circuit arrangement.

A voltage transformer, preferably a constant-current transformer, can be connected to the output of the protective circuit arrangement, where this voltage transformer generates a low-amplitude second voltage from the supply voltage in a low-loss fashion.

A comparator circuit can be connected to the output of the voltage transformer in order to generate a control signal for the protective circuit arrangement in case the output voltage exceeds a predetermined value.

Additional developments of the invention form the objects of the dependent claims.

The following description of the figures details further aspects for understanding the invention. In this respect, the depicted circuit diagram is intended to supplement the written description and to help the reader's understanding. It will be appreciated that the invention encompasses various modifications as well.

The meaning of the terms "input" or "output" can, if applicable, selectively correspond to an individual terminal or two-pole terminal. The respective meaning in any given instance will be clear to those of skill in the art.

Other objects and advantages of the invention will become apparent upon reading the following detailed description and upon reference to the drawings, in which:

Figure 1:
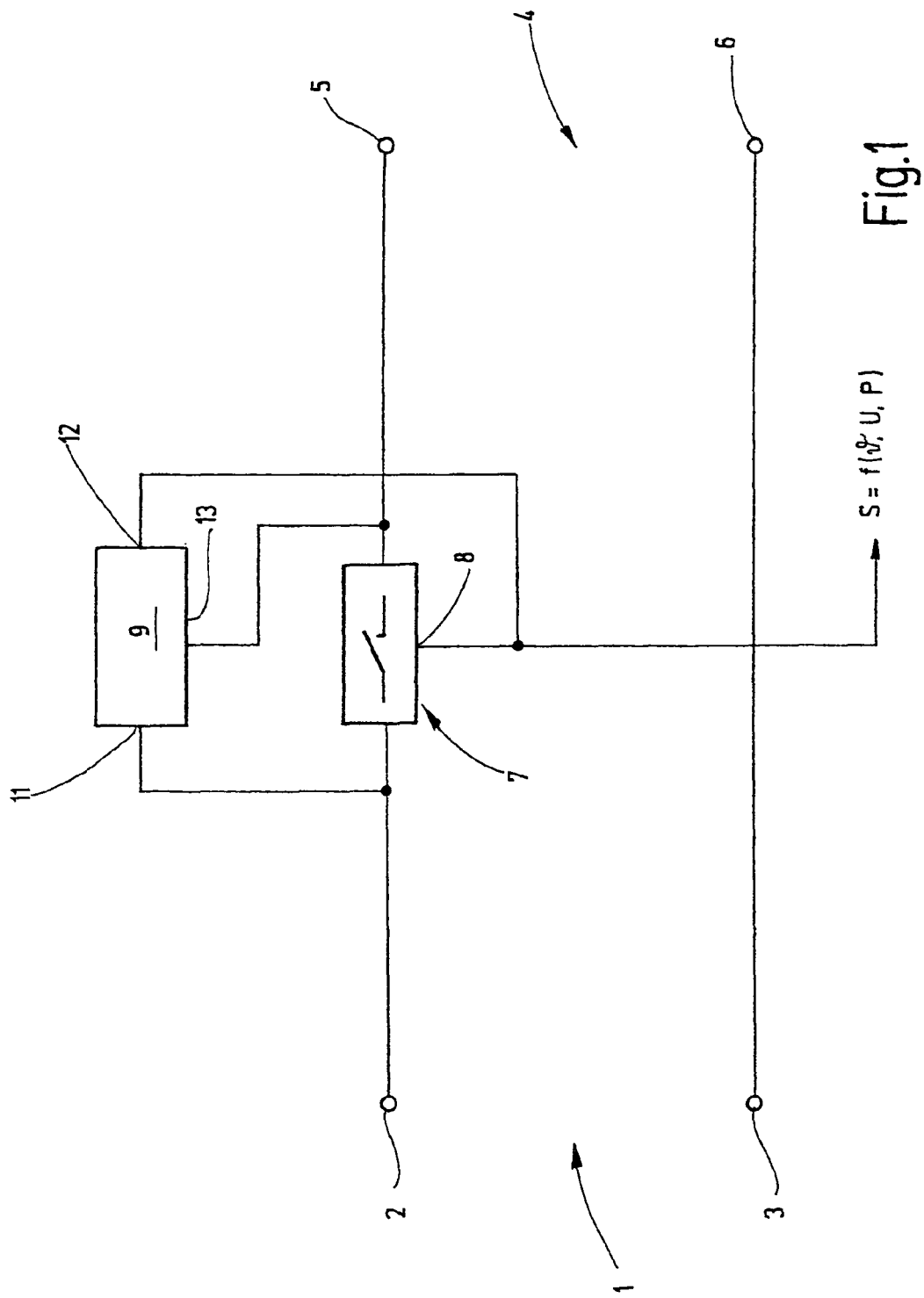
FIG. 1 shows a block diagram of a first embodiment of the protective circuit arrangement according to the invention.

While the invention is susceptible to various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

FIG. 1 shows a protective circuit arrangement that is designed for interrupting the electrical connection if an excessively high voltage appears at the output. The circuit arrangement features an input 1 with first and second input terminals 2, 3 and a two-pole output 4 with a first output terminal 5 and a second output terminal 6. A direct electrical connection is produced between the second input terminal 3 and the second output terminal 6, whereas the connection between the first input terminal 2 and the first output terminal 5 contains an electronic switching device 7 that features a control input 8. The control input 8 makes it possible to selectively change the electronic switching device 7 over from the conductive to the blocking state and back. In the conductive state, the terminals 2 and 5 are connected to one another, whereas this connection is interrupted in the blocked state.

A combined power and/or current monitoring circuit 9 with terminals 11, 12 and 13 is associated with the switching device 7. The terminals 11 and 13 form the control input and are connected to the terminals 2 and 5. The terminal 12, in contrast, forms an output that is connected to the control input 8.

In the figures, the various signals that can serve for changing over the switching device as a function of the temperature, the voltage or the power are schematically identified by the reference symbol s.

The circuit arrangement operates as described below:

A power source (not shown) with the ability to deliver a voltage that fulfills the intrinsic safety conditions in explosion protection is connected to the input terminals 2 and 3. The terminals 5 and 6 are connected to a load that is supplied with electrical energy via the circuit arrangement according to FIG. 1. During normal operation, the signal s delivered to the control input 8 of the switching device 7 causes the switching device 7 to remain in the conductive state.

If the control input 8 receives a signal s that signals an operating state hazardous to the switching device, for example, due to the fact that the temperature has increased to an impermissible level on the secondary side in areas exposed to explosion hazards, namely at components that are supplied with electrical energy by the switching device 7, or due to the fact that an excessively high voltage or an excessively high power loss occurs at any point, this signal s reaches the control input 8 and causes the switching device 7 to interrupt the electrical connection between the first input terminal 2 and the first output terminal 5. The subsequent current flow is limited to the maximum current flow from the terminal 11 to the terminal 13 permitted by the monitoring circuit 9. Since this current path has a very high resistance, hazardous switching states are reliably precluded. The intrinsic safety condition is maintained on the output side or secondary side of the circuit arrangement.

If a situation arises in the normal operating state in which the voltage drop at the switching device 7 exceeds a predetermined value, the monitoring device 9 initiates a shut-off of the switching device 7. For this purpose, the monitoring device 9 generates a signal at its output 12 that is fed to the control input 8 and causes the switching device 7 to shut off.

An excessively high voltage at the switching device 7 can be caused by an excessive power demand on the output side of the circuit according to FIG. 1, or by excessive heating such that an excessively high voltage drop occurs although the permissible current is not yet exceeded.

The switching device 7 therefore simultaneously acts as a current-sensing resistor, wherein the occurring voltage drop is determined by means of the monitoring circuit 9. The aforementioned shut-off occurs when a predetermined limit value is exceeded.

The monitoring circuit 9 furthermore makes it possible to enforce the adherence to certain power loss conditions. For example, MOSFET transistors lose their ability to shut off at an excessively high temperature. If such a MOSFET is used as power component in the switching device 7, the monitoring circuit 9 ensures that the temperature and therefore the voltage drop at the MOSFET remain below certain limits that ensure a reliable shut-off of the MOSFET.

Figure 2:
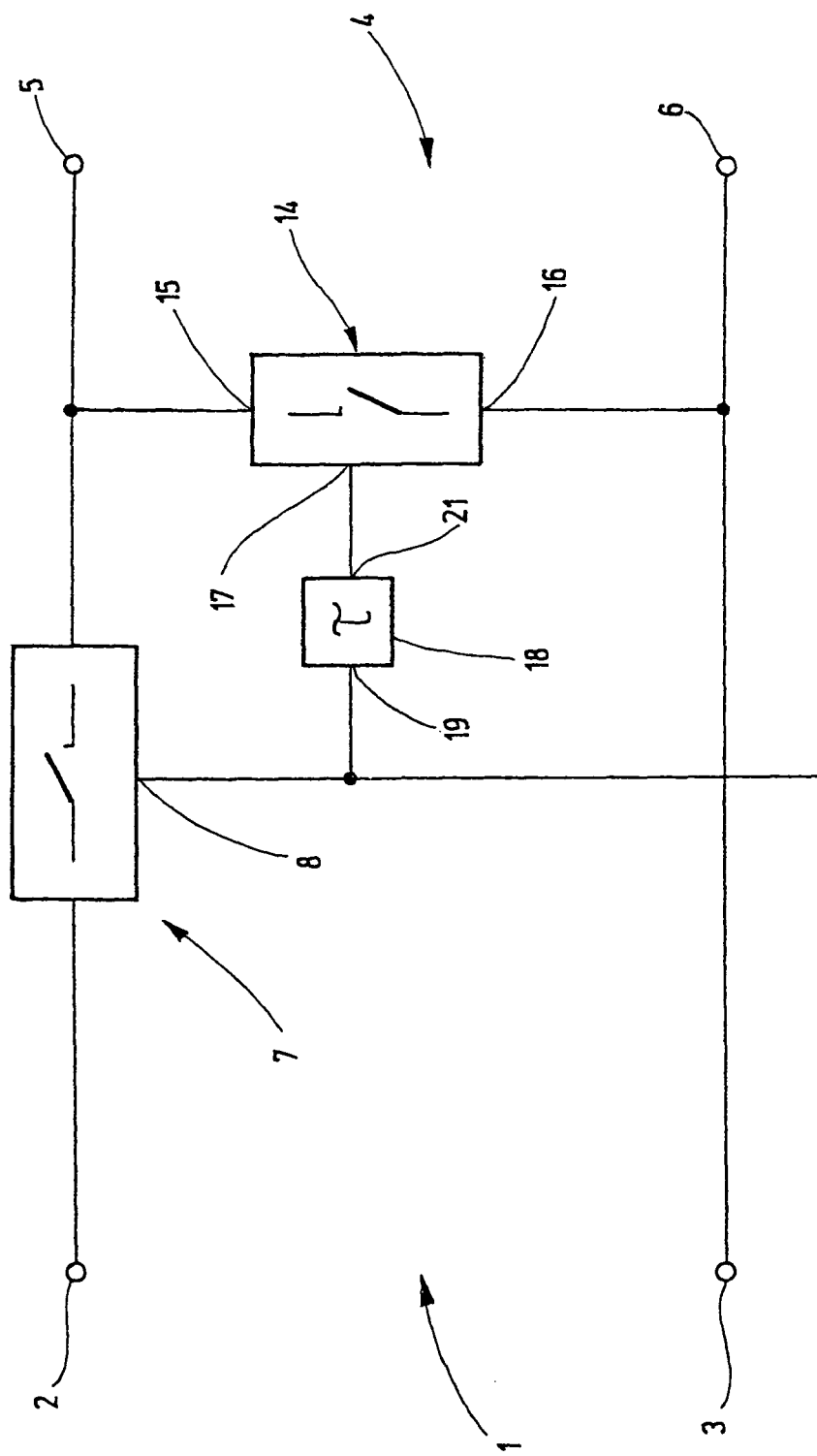
FIG. 2 shows a block diagram of a second inventive embodiment of the novel protective circuit arrangement.

FIG. 2 shows a block diagram of a circuit that is also suitable for shutting off the energy on the output side if an impermissible condition occurs on the secondary side. Elements of the circuit according to FIG. 2 that were already described are identified by the same reference symbols as in FIG. 1.

According to FIG. 2, a second switching device 14 with terminals 15 and 16 lies parallel to the two output terminals 5, 6 of the output 4. In this case, the terminals 15, 16 form the primary path of the switching device while the terminal 17 represents the control input. If a corresponding signal is received at the input 17, the primary path between the terminals 15 and 16 becomes conductive such that the output 4 is short-circuited. A time-delay element 18 with terminals 19 and 21 lies between the input 17 and the control signal s.

This circuit arrangement operates as described below:

If the control signal s reaches a state that causes a shut-off of the first switching device 7, this control signal also reaches the input of the time-delay element 18. After a predetermined time of, for example, 5 milliseconds to 20 milliseconds, the applied control signal s causes the second switching device 14 to be connected through. This through connection results in a short circuit of the output 4.

The control signal s reaches the control input 8 of the first switching device 7 without delay in order to disconnect the energy source connected to the input 1 before the output 4 is short-circuited. The highest occurring short-circuit current corresponds to the current that is returned in the direction of the output 4 from the circuit connected thereto in case of a fault. In other words, the energy source is initially disconnected before the input is short-circuited.

It should be clear that the monitoring circuit 9 according to FIG. 1 can also be implemented in the circuit according to FIG. 2.

Figure 3:
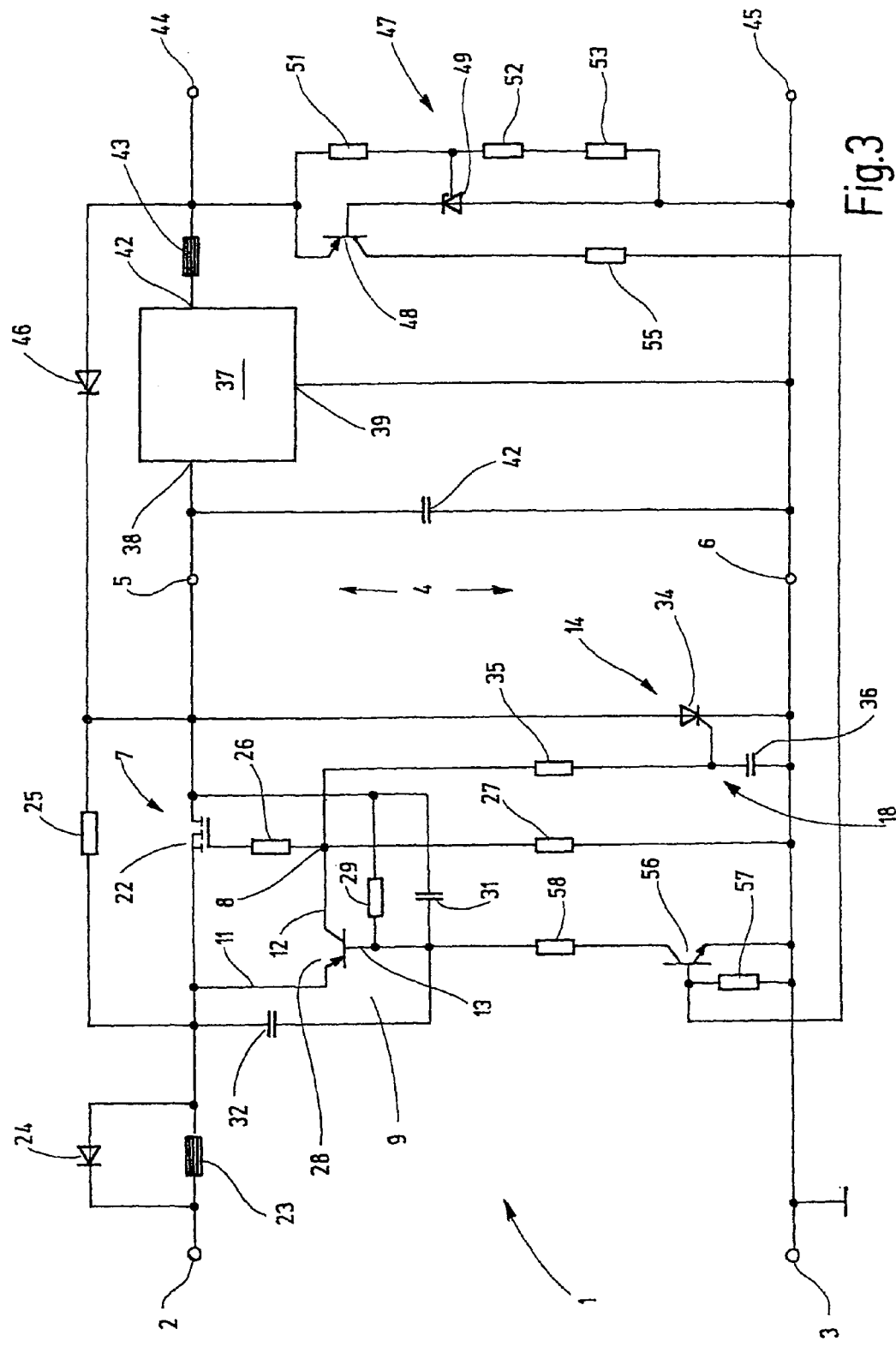
FIG. 3 shows a detailed circuit diagram of a protective circuit arrangement according to the invention in which the functions of the embodiments according to FIGS. 1 and 2 are implemented.

FIG. 3 shows a detailed circuit diagram of the inventive circuit in which the circuit blocks 7, 9, 14 and 18 are realized in an embodiment of the invention. In other respects, the same reference symbols are used for components already described.

As seen in this figure, a MOSFET 22 forms the main component of the first switching device 7. The source of the MOSFET 22 is connected to the first input terminal 2 by means of a choke 23, where a polarized diode 24 lies parallel to said choke as shown in the figure. The drain of the MOSFET 22 simultaneously forms the output terminal 5. The source and the drain of the MOSFET 22 are connected in parallel by a resistor 25 that has a resistance value of approximately 50 Ohm in practical applications.

A series resistor 26 leads from the gate of the MOSFET 22 to the input terminal 8 that is connected by means of a resistor 27 to the circuit ground, namely the connecting line between the second input terminal 3 and the second output terminal 6.

A bipolar transistor 28 forms the active component of the monitoring circuit 9. Its emitter forms the terminal 11 and its collector forms the terminal 12. A resistor 29 leads from the base of the transistor 28 that simultaneously represents the terminal 13 to the drain of the MOSFET 22. The resistor 29 can consist of an ohmic resistor or an NTC-resistor. When using an NTC-resistor, an increasing or decreasing ambient temperature that renders the monitoring circuit 9 more or less sensitive is preferably automatically taken into account in the control characteristic.

Two anti-interference capacitors 31 and 32 respectively lead from the base of the bipolar transistor 28 to the source of the MOSFET 22 and to the drain thereof. The active element of the second switching device 14 is a thyristor 34, the anode of which is respectively connected to the drain of the MOSFET 22 and to the first output terminal 5, and the cathode of which is connected to the second output terminal 6.

The time-delay circuit 18 is comprised of a resistor 35 and a capacitor 36. The resistor 35 connects the control terminal of the thyristor 34 to the control input 8, i.e., to the collector of the bipolar transistor 28. In contrast, the capacitor 36 connects the control terminal of the thyristor 34 to the second output terminal 6.

A voltage transformer 37, preferably a constant-current transformer, is supplied with electrical energy with the aid of the circuit arrangement. The constant-current transformer 37 features an input terminal 38, a ground terminal 39 and an output terminal 41. The input terminal 38 is connected to the first output terminal 5 while the ground terminal 39 is connected to the second output terminal 6. A capacitor 42 lies parallel to the two output terminals 5, 6 for the purpose of interference suppression. The capacitor 42 consists of an electrolytic capacitor that is intended to smooth highly pulsating currents drawn by the constant-current transformer 37 for the field-effect transistor 22.

Another choke 43 is connected in series to the output 41 of the constant-current transformer 37 and leads to the actual output terminal 44. This output 44 makes available a voltage that is respectively increased or decreased, preferably decreased, by the constant-voltage transformer 37 in comparison with the respective circuit ground and a terminal 45 that is connected to the second output terminal 6 by means of a direct electrical connection. A diode 46 leads from the output terminal 44 to the drain of the field-effect transistor 22.

A voltage monitoring device 47 lies between the terminals 44 and 45, with the main active components of this voltage monitoring device consisting of a bipolar transistor 48 and a shunt regulator 49. The emitter of the bipolar transistor 48 is connected to the output terminal 44 while its base leads to the shunt regulator 49, the other end of which is respectively connected to the circuit ground and the respective output terminals 45 and 6. The control input of the shunt regulator 49 is connected to a voltage divider that is formed by ohmic resistors 51, 52 and 53 that divide the voltage between the terminals 44 and 45 in such a way that the shunt regulator 49 acts in a conductive fashion when a predetermined voltage between the terminals 44 and 45 is exceeded. This voltage is naturally higher than the sum of the base-emitter voltage of the transistor 48 and the control voltage at which the shunt regulator 49 normally connects through.

The collector of the transistor 48 is connected to the base of an amplifying transistor 56, the base of which is grounded via a resistor 57, by means of a series resistor 55. The transistor 56 is connected to the control input 13, i.e., to the base of the transistor 28, by means of an ohmic resistor 58.

The function of the circuit is as follows. It is initially assumed that the circuit is operative, i.e., a current source is connected to the input 1 and a load is connected to the output terminals 44, 45. The MOSFET 22 is conductive, the thyristor 34 is blocked, and the constant-current transformer 37 operates properly.

As long as the voltage between the terminals 44 and 45 remains within the permissible range, the shunt regulator 49 remains blocked such that the transistor 48 is also blocked. Consequently, no base current is present for the transistor 56 that also remains blocked. Due to the blocking state of the transistor 56, this transistor does not draw a current via the base-emitter path of the transistor 8, such that this transistor also remains blocked. Since the source of the MOSFET 22 lies at a higher potential than the circuit ground, the gate is connected to the circuit ground and therefore to minus by means of the resistors 26 and 27, such that the MOSFET 22 remains turned on completely up to saturation.

Since the transistor 28 is blocked, no current flows into the control input of the thyristor 34, which remains blocked. The choke 23 and the diode 24 have no effect on the function, but rather are merely provided for reasons of EMC. The diode 46 is blocked because the output voltage of the constant-current transformer 37 at the terminal 44 is lower than the output voltage at the drain of the MOSFET 22.

It is now assumed that a fault occurs in that the output voltage of the constant-current transformer 37 exceeds the permissible limit value. The exceeding of the limit value is determined with the aid of the shunt regulator 49 that switches through and thus generates a base current for the transistor 48. The now conductive transistor 48 delivers a base current for the transistor 56 that, in turn, generates a base current for the transistor 28. A current flows from the input terminal 2 to the circuit ground, i.e., to the input terminal 3, via the base-emitter path of the transistor 28, the resistor 58 and the collector-emitter path of the transistor 56.

Since the transistor 28 is thus changed over to the conductive state, its connector-emitter path connects the gate of the field-effect transistor 22 to its source by means of the resistor 26. The field-effect transistor 22 is therefore immediately blocked. The first switching device 7 is consequently switched to the blocking state while the second switching device 14 initially still remains conductive.

Since the transistor 28 is in the conductive state, a current can flow from the input terminal 2 to the capacitor 36 of the time-delay circuit 18 via the resistor 35 of the time-delay circuit 18. The voltage at the capacitor 36 respectively increases in comparison with the circuit ground and the cathode of the thyristor 34 according to the time constant. After a predetermined time delay that corresponds to the time constant, the capacitor 36 reaches a voltage that suffices for triggering the thyristor 34. After the thyristor 34 has been triggered, the output terminal 5 is connected to the output terminal 6, i.e., to the circuit ground, by means of thyristor 34. Consequently, the power supply input 38 of the constant-current transformer 37 is grounded, and no undefined potential states occur in the downstream circuit because the MOSFET 22 is switched off.

The triggering of the thyristor 34 causes the capacitor 42 to discharge and all capacitances applied to the output terminal 44 are discharged by means of the diode 46, which is now polarized in the conducting direction, and the thyristor 34. This clearly indicates that the resistor 25 ensures the flow of the holding current for the thyristor 34, and that the thyristor 34 is prevented from returning to the blocking state after the capacitors have been discharged.

The circuit arrangement can be restarted after the fault on the secondary site of the circuit arrangement is eliminated. To this end, it suffices to briefly switch off the voltage at the input 1 such that the thyristor 34 can return to the blocking state. As soon as this has occurred, the voltage at the input 1 is switched on again. Since the capacitor 42 was in the meantime discharged, it represents a short circuit for the MOSFET 22. Consequently, the longitudinal voltage at the source-drain path of the MOSFET 22 would be sufficiently high for switching the transistor 28 into the conductive state by means of the resistor 29, where this would prevent the MOSFET 22 from being switched on in the long run. The resistor 25 that serves to provide the holding current of the thyristor 34 in case of a fault now serves as an auxiliary or starting resistor, by means of which the capacitor 42 is gradually charged. This reduces the voltage at the drain-source path of the MOSFET 22 and ensures that the transistor 28 remains in the blocking state.

Beginning at a certain voltage at the capacitor 42, the MOSFET 22 is turned on and now charges the capacitor 42 with a low resistance, and also supplies a current to the remaining circuit. Therefore the circuit is now once again in the state that existed prior to the fault.

It is assumed that another fault consists of the voltage drop along the drain-source path of the MOSFET 22 exceeding the permissible limit value. The voltage limit value can be exceeded as a result of an excessively high power consumption on the secondary side or of excessive heating of the MOSFET 22 due to an excessively high power loss. The latter could lead to the MOSFET 22 no longer being controllable. It would even remain conductive and cause the circuit to fail if the gate voltage were switched off.

This is prevented by measuring the voltage drop along the drain-source path of the MOSFET 22 with the aid of the base-emitter path of the transistor 28. If this voltage drop exceeds a constructively predetermined value, the transistor 28 becomes conductive and the same mechanism as that described above with reference to an excessively high voltage at the output terminal 44 is initiated. In other words, the MOSFET 22 is initially switched off and the thyristor 34 is switched on with a time delay.

If the resistor 29 is realized in the form of an NTC-resistor as initially mentioned, the monitoring circuit 9 becomes more sensitive as the temperature increases. If the temperature increases, smaller voltage drops along the drain-source path of the MOSFET 22 suffice for activating the transistor 28 so that a shut-off occurs.

A circuit arrangement for enforcing an intrinsically safe situation in a hazardous zone features a first switching device that lies in the series arm and a second switching device that lies in the shunt arm. If a fault occurs that would violate the conditions of intrinsic safety, the first switching device is initially blocked and the second switching device is connected through with a time delay such that the output terminals are mutually short-circuited.

In addition, a monitoring device is provided for monitoring the load conditions on the switching device arranged in the series arm.

It will be appreciated that the foregoing description provides examples of the disclosed system and apparatus. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A circuit arrangement for limiting a voltage in compliance with one or more regulations for explosion-proof areas comprising:
   a two-pole energy input having first and second input terminals;
   a two-pole energy output having a first output terminal and a second output terminal that is connected to the second input terminal;
   a first controlled switching device arranged in connection between the first input terminal and the first output terminal and having a control input, the first controlled switching device adapted to be closed when a voltage difference between the first and second output terminals is within a permissible range and to open when the voltage difference between the first and second output terminals exceeds the permissible range;
   a second controlled switching device arranged in connection between the first output terminal and the second output terminal and having a control input, the second controlled switching device adapted to be open when the voltage difference between the first and second output terminals is within the permissible range and to close when a signal is present at the control input thereof; and
   a time-delay circuit, the output of which is connected to the control input of the second controlled switching device and the input of which is directly connected to the control input of the first controlled switching device, wherein the time-delay circuit is configured to activate the output thereof and cause the second controlled switching device to close after a predetermined time has passed from when the voltage difference between the first and second output terminals exceeds the permissible range and after the first controlled switching device has opened.

2. The circuit arrangement according to claim 1, wherein the first controlled switching device contains a field-effect transistor.

3. The circuit arrangement according to claim 2, wherein the field-effect transistor is a normally off field-effect transistor.

4. The circuit arrangement according to claim 1, wherein the first controlled switching device contains an ohmic resistor that lies in series electrical connection between the first input terminal and the first output terminal.

5. The circuit arrangement according to claim 1, wherein a power and/or current monitoring circuit is assigned to the first controlled switching device, wherein this power and/or current monitoring circuit measures one of the power loss at and the current through the first controlled switching device and delivers a control signal operating to open the first controlled switching device when a predetermined limit value is exceeded.

6. The circuit arrangement according to claim 5 wherein the power and/or current monitoring circuit features an amplifier, wherein the control input of the amplifier is connected in parallel circuit connection across the first controlled switching device.

7. The circuit arrangement according to claim 1, wherein the first controlled switching device contains a current-amplifying transistor, the output of which is connected to the control input of the time delay circuit.

8. The circuit arrangement according to claim 7, wherein an output of the current-amplifying transistor is connected to the control input of the first controlled switching device.

9. The circuit arrangement according to claim 1, wherein the second controlled switching device contains the time-delay circuit in its input.

10. The circuit arrangement according to claim 1, wherein the time delay circuit includes an RC-element.

11. The circuit arrangement according to claim 1, wherein the second controlled switching device includes a normally off controlled electronic component.

12. The circuit arrangement according to claim 11, wherein the normally off electronic component consists of a thyristor or triac.

13. The circuit arrangement according to claim 1, wherein a control amplifier is provided that generates a control voltage for the input of the first and the second controlled switching devices.

14. The circuit arrangement according to claim 1, wherein a voltage transformer is connected in series to the circuit arrangement.

15. The circuit arrangement according to claim 1, wherein the voltage transformer is a constant-current transformer.

16. The circuit arrangement according to claim 14, wherein the output voltage of the voltage transformer is monitored by means of a reference voltage generation, and by the fact that the control voltage for the first and the second controlled switching device is generated as soon as the output voltage of the voltage transformer exceeds a predetermined value.

* * * * *